United States Patent
Barrow

(10) Patent No.: US 7,813,737 B1
(45) Date of Patent: Oct. 12, 2010

(54) INTEGRATED DIGITAL ENHANCED NETWORK MIGRATED SUBSCRIBER MAPPING

(75) Inventor: Steven W. Barrow, South Riding, VA (US)

(73) Assignee: Nextel Communications Inc., Reston, VA (US)

(*) Notice: Subject to any disclaimer, the term of this patent is extended or adjusted under 35 U.S.C. 154(b) by 1113 days.

(21) Appl. No.: 11/492,480

(22) Filed: Jul. 25, 2006

(51) Int. Cl.
*H04W 40/00* (2009.01)
*H04W 4/00* (2009.01)

(52) U.S. Cl. ............ 455/445; 455/433; 455/432.2; 370/328; 370/349

(58) Field of Classification Search ............ 455/552.1, 455/551, 422.1, 432.2, 433, 445, 560, 432.1; 370/277, 328, 349
See application file for complete search history.

(56) References Cited

U.S. PATENT DOCUMENTS

| 6,904,285 B2* | 6/2005 | Drozt et al. ............ 455/450 |
| 2005/0135386 A1* | 6/2005 | Shores et al. ............ 370/401 |
| 2009/0029684 A1* | 1/2009 | Rosenblatt et al. ....... 455/414.1 |

* cited by examiner

*Primary Examiner*—George Eng
*Assistant Examiner*—Marcos L Torres

(57) ABSTRACT

An apparatus and method for mapping a newly assigned Universal Fleet Member Identifier (UFMI) to a previously assigned UFMI is disclosed. In an embodiment, an Integrated Digital Enhanced Network (iDEN) routing request message is received from a dispatch application processor (DAP) associated with a calling party at a serving home location register (HLR) of a called party. The routing request message includes a previously assigned UFMI of the called party. A newly assigned UFMI of the called party is obtained by the HLR by consulting a subscriber table stored in the HLR. An iDEN routing response message is transmitted to the DAP by the HLR, where the routing response message includes the newly assigned UFMI associated with the called party.

19 Claims, 3 Drawing Sheets

INTEGRATED DIGITAL ENHANCED NETWORK MIGRATED SUBSCRIBER MAPPING

FIELD OF THE INVENTION

The present invention relates generally to the field of telecommunications, and in particular, to a method and apparatus for mapping a newly assigned Universal Fleet Member Identifier (UFMI) of a migrated subscriber of an Integrated Digital Enhanced Network (iDEN) to a previously assigned UFMI.

BACKGROUND OF THE INVENTION

Currently, a subscriber to a telecommunications service provider is assigned a Universal Fleet Member Identifier (UFMI) number. This number is utilized in the Integrated Digital Enhanced Network (iDEN) dispatch network to route a dispatch call to that particular subscriber, in a manner similar to the way that a telephone number is used in a conventional telephone network. Thus, the UFMI number is the "telephone number" of a subscriber for dispatch calls in the iDEN network. This number may be, for example, 164*100*199. As is known, a dispatch call is commonly known as a "walkie-talkie" type of call, such as provided by Sprint Nextel Corporation and identified by the trade names Push-To-Talk (PTT) or Direct Connect. Thus, dispatch communications are half-duplex communications where only one person at a time is able to speak.

As the network for supporting such dispatch calls evolves from the iDEN technology to a next generation technology, e.g., Code Division Multiple Access (CDMA), it will be required that the subscribers be assigned new UFMIs. Thus, as a subscriber is migrated to being serviced by the next generation network, a new UFMI will be required for that subscriber. This presents problems. For example, if an iDEN network subscriber attempts to make a dispatch call to a migrated subscriber on the next generation network by using the migrated subscriber's old iDEN UFMI, the dispatch call attempt will fail.

One approach for attempting to solve this problem is for the migrated subscriber himself or herself to provide each of the iDEN subscribers that want to contact him/her with their new number. However, for a variety of reasons, as can be understood, this is inconvenient and inefficient. Therefore, there is a need to provide a method and apparatus for mapping a newly assigned Universal Fleet Member Identifier (UFMI) of a migrated subscriber of an Integrated Digital Enhanced Network (iDEN) to a previously assigned UFMI when establishing a dispatch call.

SUMMARY OF THE INVENTION

In accordance with an embodiment of a method of the present invention, a method for mapping a Universal Fleet Member Identifier (UFMI) to a previously assigned UFMI is provided. The method includes receiving an Integrated Digital Enhanced Network (iDEN) routing request message from a dispatch application processor (DAP) associated with a calling party at a serving home location register (HLR) of a called party. The routing request message includes a first UFMI associated with the called party. A second UFMI of the called party is obtained by the HLR by consulting a subscriber table stored in the HLR. An iDEN routing response message is transmitted to the DAP by the HLR, where the routing response message includes the second UFMI associated with the called party.

In accordance with an embodiment of a system of the present invention, a system for mapping a UFMI to a previously assigned UFMI is provided. The system includes an Integrated Digital Enhanced Network (iDEN). The iDEN network includes the DAP associated with the calling party and the HLR associated with the called party. The HLR includes the subscriber table. An iDEN routing request message that includes a first UFMI associated with the called party is received from the DAP at the HLR, where the HLR obtains a second UFMI associated with the called party by consulting the subscriber table. The HLR transmits an iDEN routing response message that includes the second UFMI to the DAP.

DETAILED DESCRIPTION OF THE EXEMPLARY EMBODIMENTS

Figure 1:
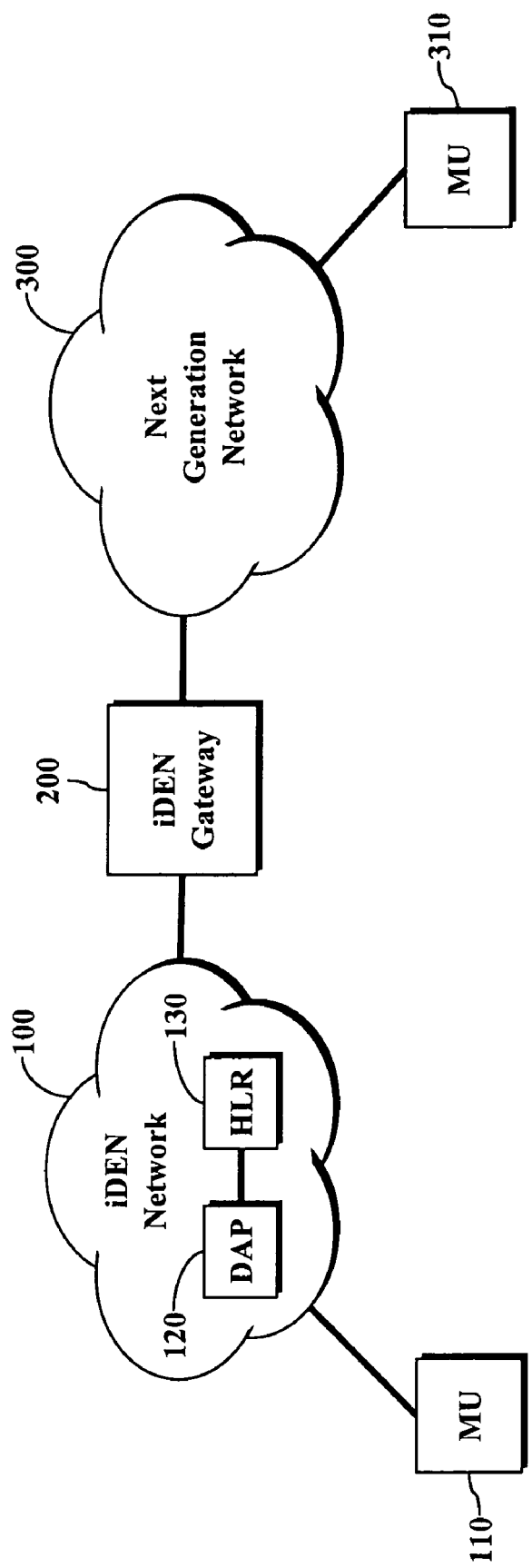
FIG. 1 illustrates a network architecture for a dispatch network.

FIG. 1 illustrates a network architecture for a dispatch network in which the present invention can be utilized. As can be seen, the architecture includes an Integrated Digital Enhanced Network (iDEN) 100, an iDEN gateway 200, and a next generation network 300. The iDEN network, as is known, is provided by Motorola and provides, generally, for dispatch communication services. As is also known, and as discussed above, dispatch communications are half-duplex communications where only one person at a time is able to speak. The iDEN Network includes, among other components, a dispatch application processor (DAP) and a home location register (HLR). Since these components, and the functionality of these components, are known to those of skill in the art, no further general explanation of these components will be provided. However, additional functionality for these components in accordance with the principles of the present invention will be discussed later in this specification.

Further in the architecture, the iDEN gateway 200 provides for interoperability between the iDEN network 100 and the next generation network 300. The next generation network also provides dispatch communications services but utilizes a different technology than the iDEN network. Thus, the gateway provides for interoperability between these two technologies. The next generation network is not limited to any particular technology. One example of such a technology is CDMA, as provided by Qualcomm with it's QChat technology. The next generation network can also use Push-to-Talk over Cellular (PoC) technology.

As illustrated in FIG. 1, mobile communications unit 110 is a unit that utilizes a communications service provider's iDEN network, and thus the iDEN technology, for dispatch communications. As such, the unit has a UFMI that is associated with the iDEN network. Mobile communications unit 310 is represented in FIG. 1 as being associated with a subscriber to the communications service provider that has been migrated to using the technology of the next generation network. For example, mobile unit 310 has been migrated from the iDEN technology to the CDMA technology.

As discussed previously, problems can develop when a subscriber is migrated from the iDEN network to the next generation network. For this migrated subscriber, before the migration to the new technology, the mobile unit 310 had assigned to it a UFMI associated with the iDEN network. After the migration, the mobile unit 310 was assigned a new UFMI that is associated with the next generation network 300. Thus, mobile unit 310 has changed its UFMI. Mobile unit 110, because it has not migrated to the next generation network, still has a UFMI that is associated with the iDEN network.

The present invention provides utility particularly in this circumstance where mobile unit 110 (the calling party) places a dispatch call to migrated mobile unit 310 (the called party) through iDEN network 100 when the call request is placed by mobile unit 110 by using the previously assigned UFMI of mobile unit 310. Because the user of mobile unit 110 does not know that the UFMI of mobile unit 310 has changed, he/she will attempt to place a dispatch call to unit 310 by using its prior UFMI. Since iDEN network 100 no longer recognizes this prior UFMI for the migrated mobile unit 310, currently, the dispatch call request will fail. In accordance with the principles of the present invention, the present invention provides for establishment of the dispatch call with mobile unit 310 even when the call request from mobile unit 110 utilizes the previously assigned UFMI for mobile unit 310. As will be discussed further later in this specification, the present invention modifies the iDEN HLR to include a subscriber table and the iDEN DAP is modified to interpret and use the newly assigned UFMI for mobile unit 310 that is received at the DAP in a modified routing response message from the HLR.

Figure 2:
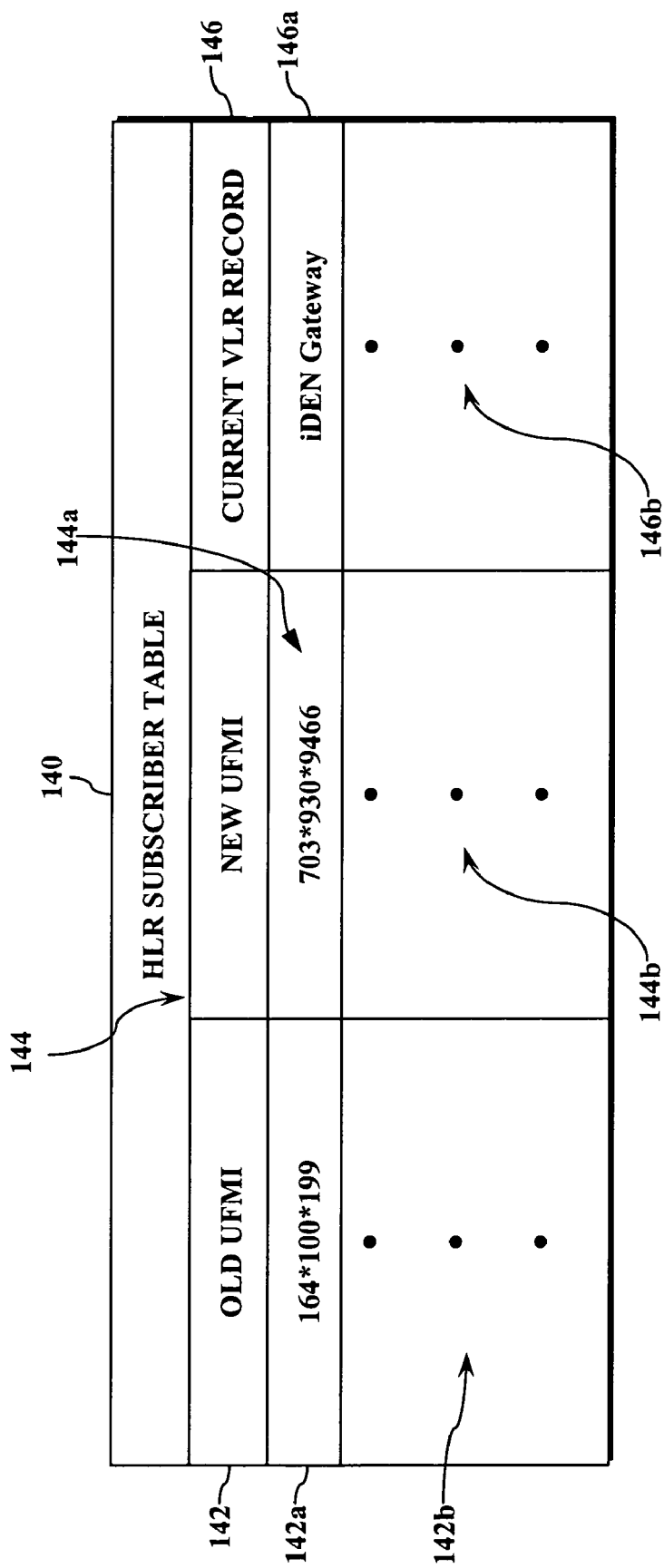
FIG. 2 is an embodiment of a home location register subscriber table in accordance with the principles of the present invention.

As discussed above, in accordance with the principles of the present invention, the iDEN HLR (iHLR) and DAP are modified. In the iHLR, a subscriber table, i.e., an external subscriber table, is added. The table is provided for service provider subscribers, e.g., of Sprint Nextel, that have migrated to the next generation dispatch network 300, e.g., QChat by Qualcomm. The migrated subscriber is still provisioned in the iHLR, but now as an "external" subscriber, since the subscriber is no longer utilizing the technology of the iDEN network, but rather, has migrated to the next generation network. As such, the migrated subscriber's old iDEN provisioning information no longer exists in the iHLR, other than in the external subscriber table. The external subscriber table 140 in the iHLR, as illustrated in FIG. 2, maintains the migrated subscriber's old UFMI 142, the new UFMI 144, and the current visited location register (VLR) record 146 which, as will be further explained, is the iDEN gateway 200 which looks to the iDEN network as a pseudo DAP (iDEN gateway P-DAP). As an example for these parameters, the old iDEN UFMI 142*a* is 164\*100\*199, the new UFMI 144*a* is 703\*930\*9466, and the current VLR record 146*a* is the iDEN gateway. Of course, the external subscriber table also maintains this same information for other migrated subscribers, as illustrated by old UFMIs 142*b*, new UFMIs 144*b*, and current VLR records 146*b*. Since all of the subscribers in the table have been migrated to the same next generation network, the current VLR records for each of these migrated subscribers will be the same parameter. However, if an individual one(s) of the migrated subscribers has migrated to a different next generation network, the current VLR record may point to a different parameter associated with the different next generation network, e.g., a different network gateway.

In addition to including the subscriber table in the iHLR, as will be further discussed below, in accordance with the principles of the present invention, the currently existing iDEN "routing response" message sent from the iHLR to the DAP is modified to include the migrated subscriber's new UFMI and location (iDEN gateway (iGW)).

Further with respect to modifications to the DAP in accordance with the principles of the present invention, and as will be further discussed below, since the iHLR "routing response" message now includes the migrated subscriber's new UFMI, the DAP is modified to interpret the new iDEN "routing response" message and to use the new UFMI in the iDEN "private call request forward" message that is sent to the iDEN gateway.

Figure 3:
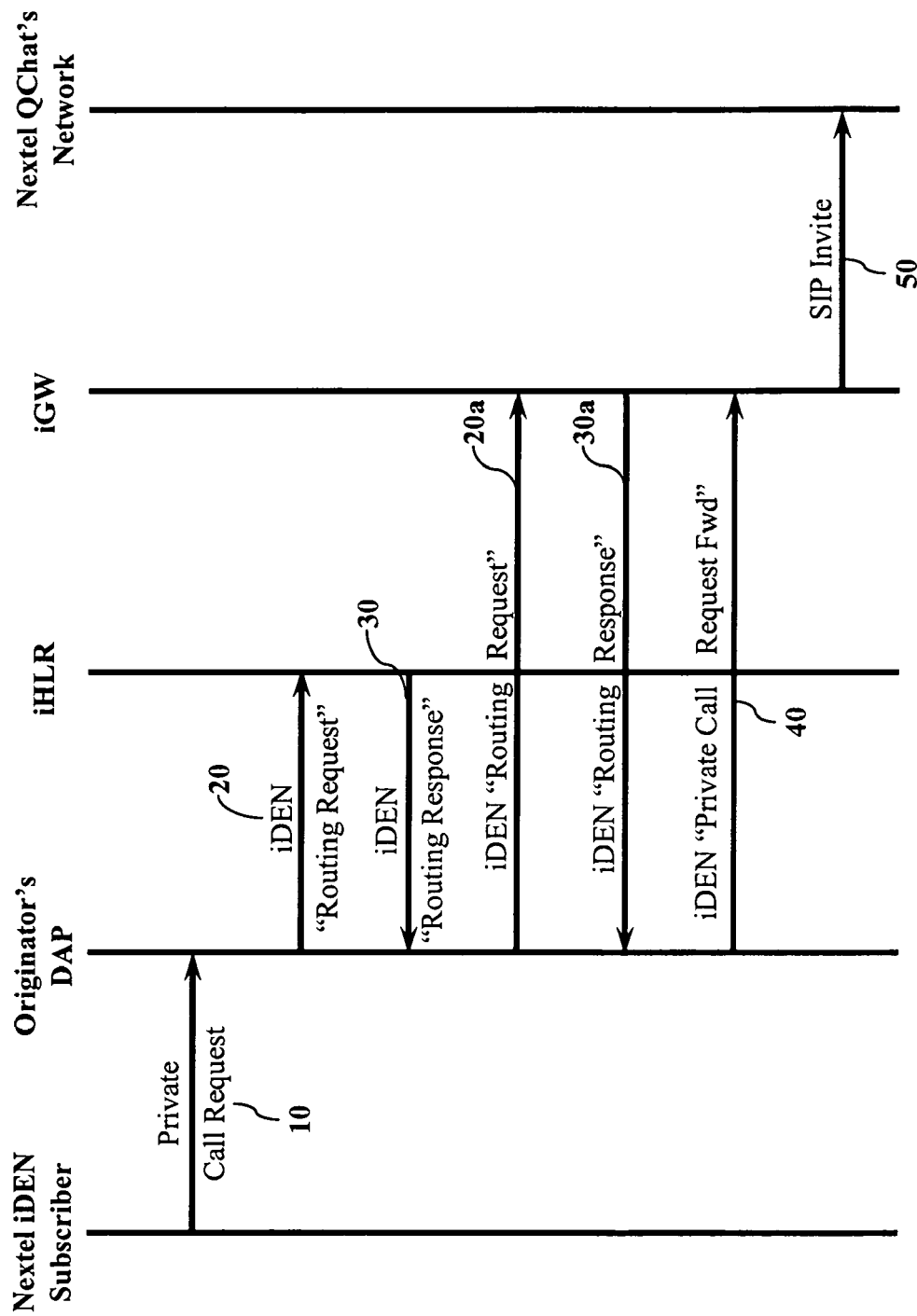
FIG. 3 is a call flow diagram that illustrates embodiments of the method and system of the present invention for mapping a newly assigned Universal Fleet Member Identifier (UFMI) of a migrated subscriber of an Integrated Digital Enhanced Network (iDEN) to a previously assigned UFMI.

FIG. 3 is a call flow diagram that illustrates embodiments of the method and system of the present invention, using the modifications to the iHLR and DAP, as discussed above. As can be seen, the calling party, i.e., the non-migrated Nextel subscriber that utilizes the iDEN technology and network, transmits a private call request 10 from the mobile unit of the calling party for a dispatch call with the migrated subscriber, i.e., the called party or target user. In this circumstance, as discussed previously, the target user is a migrated Nextel subscriber on Nextel's next generation dispatch network 300, e.g., QChat. The private call request message 10 is sent from mobile unit 110, referring back to FIG. 1, to the DAP associated with the calling party, i.e., the originator's DAP. This is in accordance with known iDEN protocol. The iDEN private call request 10 includes the migrated Nextel subscriber's old Nextel UFMI, e.g., 164\*100\*199.

As per standard, known iDEN protocol, upon receipt of the private call request 10 at the originator's DAP, the DAP tries to determines the location of the target user (the migrated Nextel subscriber) via the DAP VLR, Recent Call Record (RCR) Cache, and iHLR Query. Since the migrated target user is not in the DAP's VLR or in the DAP's RCR Cache, as per standard iDEN protocol, the originating DAP checks it's Global Title Translation (GTT) table to determine the target user's serving iHLR based on the target's UFMI and the originating DAP sends a standard iDEN routing request message 20 to the target user's serving iHLR.

As per standard iDEN protocol, upon receipt of the iDEN routing request message 20 at the serving iHLR from the originator's DAP, the target user's serving iHLR checks it's database for the target user's current VLR (the serving DAP). Since the target user is a migrated Nextel subscriber on Nextel's next generation dispatch network 300, the serving iHLR uses the information in the external subscriber table 140 to determine the target user's new UFMI. In an embodiment, the target user's new UFMI matches the migrated subscriber's PTN, e.g., PTN 703-930-9466. As is known, the PTN is the phone number used by a Nextel subscriber for interconnect phone calls, i.e., normal cell phone calls. Thus, the old UFMI is 164\*100\*199 and the new UFMI is 703\*930\*9466. Since the target user is a migrated subscriber, the current VLR value is the iDEN gateway (iGW), e.g., IP Address of an iDEN gateway pseudo DAP (P-DAP). As discussed previously, the external subscriber table associates the old UFMI with the new UFMI and the current VLR value.

In accordance with the principles of the present invention, in the iDEN routing response message 30 that is sent from the migrated Nextel subscriber's serving iHLR back to the originator's DAP, the message also includes the migrated subscriber's new UFMI. Currently, the routing response message does not include this information. Currently, the iDEN routing response message 30, as per standard iDEN protocol, contains the migrated subscriber's current VLR value, which as discussed above, is the iDEN gateway. Therefore, in the present invention, the iDEN routing response message 30 is extended to accommodate the migrated Nextel subscriber's new UFMI, e.g., 703*930*9466 which matches the PTN.

At the originator's DAP, upon receipt of the iDEN routing response message 30 from the migrated Nextel subscriber's serving iHLR, as per standard iDEN protocol, the originator's DAP forwards a private call request forward message 40 to the iDEN gateway based on the current VLR value. A private call request forward message is a request for a dispatch call between two parties, i.e., the calling party and the called party. This is distinguished from a group call request where the calling party requests that a dispatch call be setup with a predefined group of called parties. However, in accordance with the principles of the present invention, this private call request forward message 40 from the originator's DAP now also includes the new UFMI. Thus, as explained previously, the DAP is modified to now interpret the new iDEN routing response message 30 and to use the new UFMI in the iDEN private call request forward message 40 that is sent to the iDEN gateway.

Continuing with the call flow, as per standard iDEN protocol, upon receipt of the iDEN private call request forward message, the iDEN gateway performs a cache lookup and then GTT lookup of the new UFMI to determine the target user's serving domain, i.e., the QChat domain. The iDEN gateway sends a SIP invite message 50 to the Nextel next generation dispatch network 300, e.g., the QChat network, using the migrated target user's new UFMI in the SIP URI, e.g., 703*930*9466@qchat.nextel.com. Upon receipt of the SIP invite with the migrated Nextel subscriber's SIP URI, the next generation dispatch network uses the standard protocol, e.g., standard QChat protocol, to locate the migrated target user. Once the target user is located on the next generation dispatch network, existing call setup messaging is used between the iDEN and next generation technologies to complete the call setup.

In an alternative embodiment, as also illustrated in FIG. 3, instead of including the new UFMI and the current VLR value (iDEN gateway—iDEN gateway P-DAP) in the iDEN routing response message 30, the serving iHLR only returns the new UFMI in the iDEN routing response message 30 back to the originating DAP. Upon receipt of the iDEN routing response message 30 with the migrated target user's new UFMI, the originating DAP checks it's VLR, RCR cache, and, if necessary, the GTT to find the new serving iHLR of the target user. Since the target user's new UFMI points to the iDEN gateway, as determined by the originating DAP, the originating DAP sends another iDEN routing request message 20a to the iDEN gateway, which looks to the DAP as a pseudo serving iHLR. The DAP then waits for a second iDEN routing response message 30a, this time from the iDEN gateway (pseudo serving iHLR). The originating DAP updates its RCR cache with the target user's old UFMI and current VLR, i.e., the iDEN gateway as the iDEN gateway. The remaining steps of the method, i.e., steps 40, 50 and follows, as described above, remain the same as in the first embodiment.

Thus, in both embodiments, in accordance with the principles of the present invention, the iDEN routing response message 30 includes the new UFMI of the migrated targeted user. The new UFMI is used by the calling party's DAP for further completing of the dispatch call setup process. Thus, the apparatus and method of the present invention provide for mapping a newly assigned UFMI of a migrated subscriber of an iDEN network to a previously assigned UFMI when establishing a dispatch call.

The disclosed embodiments are illustrative of the various ways in which the present invention may be practiced. Other embodiments can be implemented by those skilled in the art without departing from the spirit and scope of the present invention.

What is claimed is:

1. A method for mapping a Universal Fleet Member Identifier (UFMI) to a previously assigned UFMI, comprising the steps of:
    receiving an Integrated Digital Enhanced Network (iDEN) routing request message from a dispatch application processor (DAP) associated with a calling party at a serving home location register (HLR) of a called party, wherein the routing request message includes a first UFMI associated with the called party;
    obtaining a second UFMI of the called party by the HLR by consulting a subscriber table stored in the HLR;
    transmitting an iDEN routing response message to the DAP by the HLR, wherein the routing response message includes the second UFMI associated with the called party;
    determining a second HLR associated with the called party by the DAP by using the second UFMI, wherein the second HLR is associated with a gateway from an iDEN network;
    transmitting a second iDEN routing request message from the DAP to the gateway, wherein the second routing request message includes the second UFMI; and
    transmitting a second iDEN routing response message to the DAP by the gateway.

2. The method of claim 1 wherein the newly assigned UFMI is a same number as an interconnect phone number associated with the called party.

3. The method of claim 1 further comprising the step of provisioning the called party as an external subscriber in the HLR.

4. The method of claim 1 wherein the routing response message also includes a parameter identifying a current visited location register (VLR) associated with the called party.

5. The method of claim 4 wherein the current visited location register is associated with a gateway from an iDEN network.

6. The method of claim 1 wherein the subscriber table includes the previously assigned UFMI, the newly assigned UFMI, and a parameter identifying a current visited location register (VLR) associated with the called party, and wherein the table associates the previously assigned UFMI to the newly assigned UFMI and to the parameter identifying the current VLR.

7. The method of claim 1 wherein the previously assigned UFMI is associated with an iDEN network and the newly assigned UFMI is associated with a next generation network.

8. The method of claim 7 wherein the next generation network is a Code Division Multiple Access (CDMA) network.

9. The method of claim 7 wherein the next generation network uses Push-to-Talk over Cellular (PoC).

10. The method of claim 5 further comprising the step of receiving a private call request forward message at the gateway from the DAP, wherein the private call request forward message includes the newly assigned UFMI.

11. A system for mapping a Universal Fleet Member Identifier (UFMI) to a previously assigned UFMI, comprising:
    an Integrated Digital Enhanced Network (iDEN) including:
        a dispatch application processor (DAP) associated with a calling party; and
        a home location register (HLR) associated with a called party and including a subscriber table;

wherein an iDEN routing request message that includes a first UFMI associated with the called party is received from the DAP at the HLR, wherein the HLR obtains a second UFMI associated with the called party by consulting the subscriber table, and wherein the HLR transmits an iDEN routing response message that includes the second UFMI to the DAP:

and further wherein the DAP determines a second HLR associated with the called party by using the second UFMI and wherein the second HLR is associated with a gateway from the iDEN network.

12. The system of claim 11 wherein the routing response message also includes a parameter identifying a current visited location register (VLR) associated with the called party.

13. The system of claim 12 wherein the current visited location register is associated with a gateway from the iDEN network.

14. The system of claim 11 wherein the subscriber table includes the first UFMI, the second UFMI, and a parameter identifying a current visited location register (VLR) associated with the called party, and wherein the table associates the first UFMI to the second UFMI and to the parameter identifying the current VLR.

15. The system of claim 11 wherein the first UFMI is associated with the iDEN network and second UFMI is associated with a next generation network.

16. The system of claim 15 wherein the next generation network is a Code Division Multiple Access (CDMA) network.

17. The system of claim 15 wherein the next generation network uses Push-to-Talk over Cellular (PoC).

18. The system of claim 11 wherein the DAP transmits a second iDEN routing request message to the gateway and wherein the second routing request message includes the second UFMI.

19. The system of claim 18 wherein the gateway transmits a second iDEN routing response message to the DAP.

* * * * *